United States Patent Office 3,470,530
Patented Sept. 30, 1969

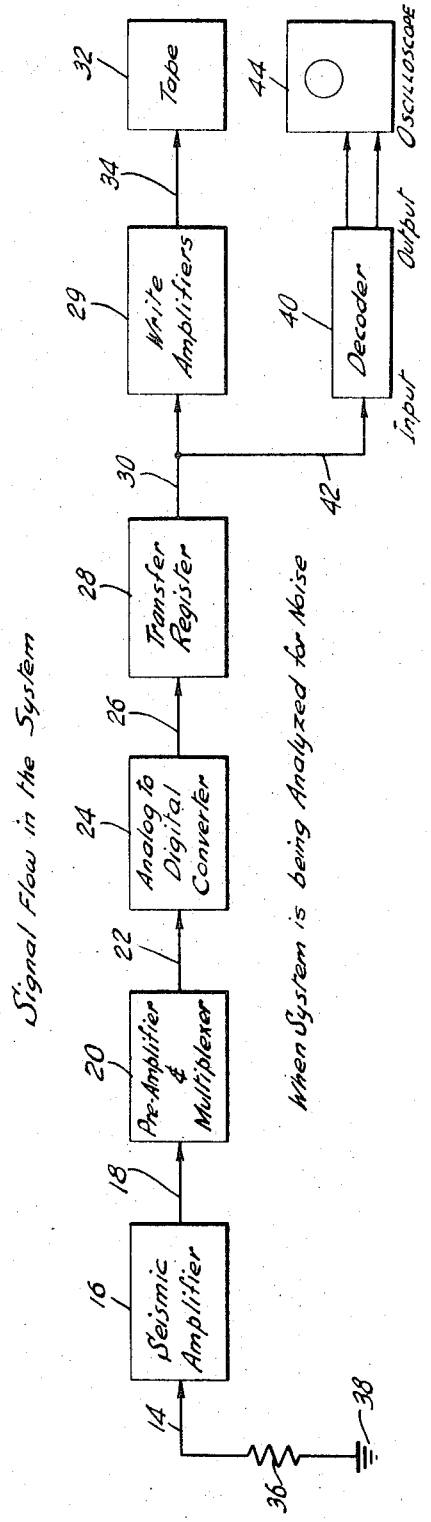

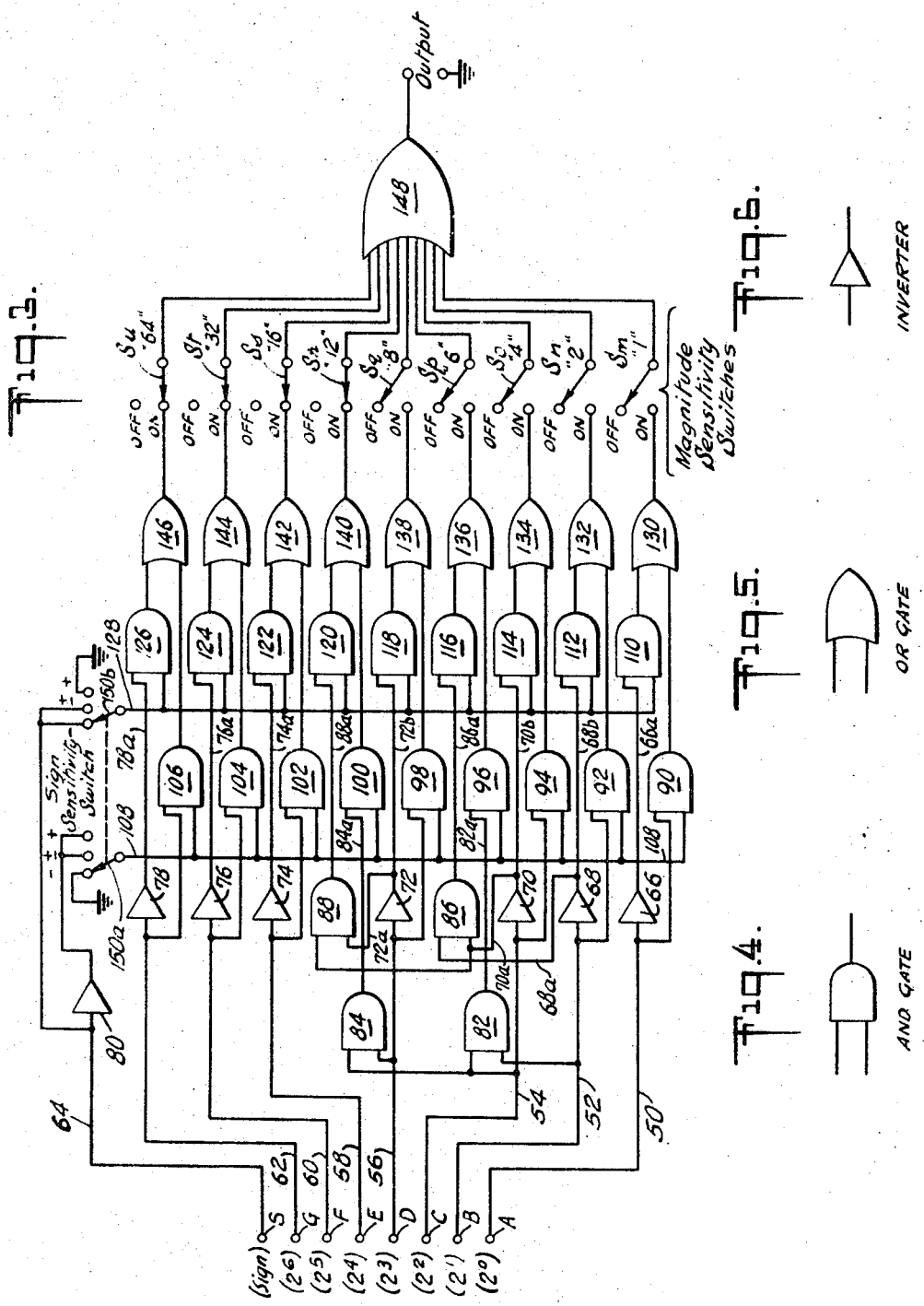

3,470,530
NOISE ANALYSIS FOR SEISMIC SYSTEM
Thomas L. Smitherman, Houston, Tex., assignor to Texaco Inc., New York, N.Y., a corporation of Delaware
Filed Dec. 12, 1967, Ser. No. 689,828
Int. Cl. G01v 1/28
U.S. Cl. 340—15.5          3 Claims

ABSTRACT OF THE DISCLOSURE

In a seismic signals data processing system, noise is detected and measured by making the input seismic signal zero and encoding the noise signals in digital form for storage in a transfer register. The digital output of the transfer register is fed in the form of a digital word to a decoder comprising a number of logic elements. The decoder determines whether the magnitude of the digital word being checked is above certain selectable limits. Inasmuch as each digital word written in the signal channels is analyzed, their variation in magnitude and sign can be interpreted as noise. Hence, the overall digital system may then be judged as to whether it complies with preselected specifications relating to system noise.

---

This invention pertains, in general, to seismic prospecting; and, in particular, to ascertaining the signal-to-noise ratio of a seismic signal data processing sytem.

More recently, seismic signals have been stored on magnetic tape in digital form pending the making of seismographs at a later time. Briefly stated, in such a system a geophone converts acoustic signals to electrical signals. These electrical signals are then serially processed through: a seismic amplifier, a pre-amplifier multiplexer, an analog to digital converter, a transfer register, a write amplifier and, ultimately, the digital signals are stored on magnetic tape. The seismic amplifier, pre-amplifier, multiplexer, analog to digital converter and transfer register as well as the elements comprising these components are all potential sources of noise. Moreover, the concatenation of the foregoing units is also a source of noise. When seismic signals are being processed through the aforementioned components for recordation on the tape recorder, the noise inherent in these various units, as well as in the concatenation thereof, tends to obliterate, mask, distort or otherwise interfere with the seismic signals. Thus, in many cases, the seismic information to be recorded is either lost or grossly inaccurate.

One object of the present invention is to determine the noise present in a seismic signals processing system.

Another object of the invention is to determine the signal-to-noise ratio in a seismic signals processing system.

Another object of the invention is to provide a method and apparatus for determining the noise as well as the signal-to-noise ratio in a digital seismic signals processing system.

In accordance with the invention there is provided a digital seismic system including means for amplifying input seismic signals in analog form, converting the amplified analog seismic signals to digital form and storing digital signals. The improvement according to the invention is comprised of the steps of: reducing the input seismic signals to zero magnitude, and determining whether the magnitude of the resultant digital signals is within preselected magnitude limits.

The various features of novelty which characterize the invention are pointed out with particularity in the claims annexed to and forming part of this specification. For a better understanding of the invention, its operating advantages and specific objects attained by its use, reference is to be had to the accompanying drawings and descriptive matter in which there is illustrated and described a preferred embodiment and practice of the invention.

In the drawings:

FIG. 2 is the system of FIG. 1 as modified by the present invention when said system is being analyzed for the presence of inherent noise therein.

FIG. 3 is a circuit diagram of the logic circuitry employed in the decoder according to the present invention.

FIG. 4 is a representation of an AND gate.

FIG. 5 is a representation of an OR gate.

FIG. 6 is a representation of an inverter element.

Throughout the drawing figures like reference numbers are used to denote like elements or components.

FIG. 1 shows the signal flow in a digital seismic signal processing system when the system is processing and recording seismic signals.

Figure 1:
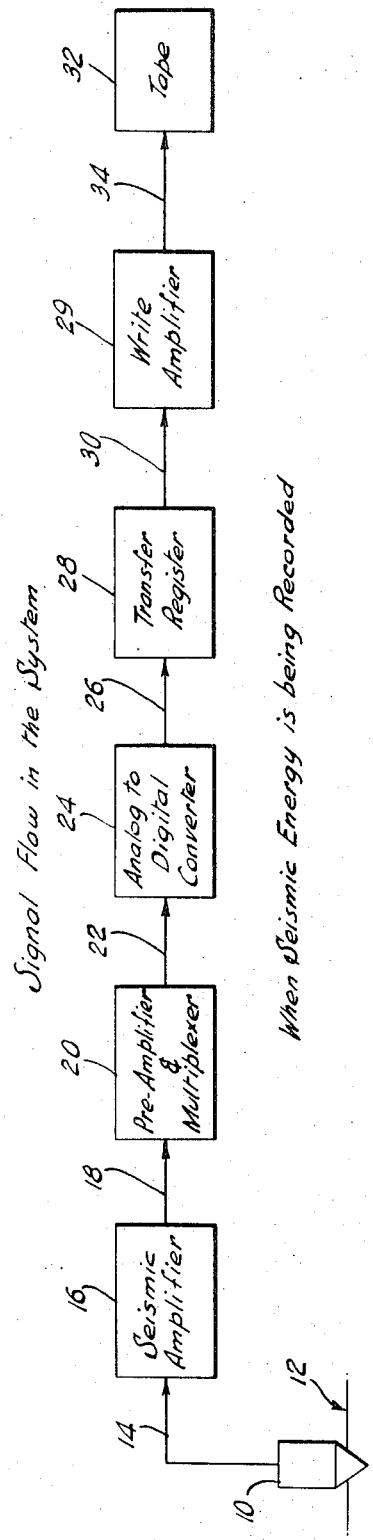
FIG. 1 is a block diagram showing a digital seismic signal processing system set up for the recordation of seismic energy.

As is shown in FIG. 1 a geophone 10 is located on the surface of the earth 12. Geophone 10 receives seismic energy reflected from the earth and then converts the seismic energy to electrical signals. As will be appreciated by those skilled in the art, in seismic exploration and, more particularly, in the reflection type of seismic exploration work, the general procedure involves the following stems: First, a shothole is drilled in the earth in order to provide a more effective way of detonating an explosive charge for generating seismic energy at a given point on the earth's surface or near the surface, Thus, the most familiar procedure generally employed is that of using a shallow hole drilling rig to drill a shothole on the order of 20 to 100 or so feet deep. Then a charge of explosive is loaded in the shothole near the bottom thereof. Usually, the explosive located in the hole is tamped by covering the charge with water or a similar fluid. Next, the procedure involves spreading out along the surface of the earth a plurality of seismic energy detectors or geophones. where a shothole and explosive charge is employed, the geophone spread usually includes one so-called "uphole" geophone that is located substantially at or close to the top of the shothole to receive the seismic energy which arrives at the surface directly above the explosive charge. All of the geophones, however, will be connected, electrically, to an instrument truck or other equipment for transporting the necessary instruments that are employed in making a record of the seismic energies which are represented at the output of the geophones by electrical signals. Finally, a record is made on a suitable recording medium such as magnetic tape, which records the signals that are generated by the geophones during the period from just prior to the detonation of the explosive charge to a desired time following such detonation so as to include on the record the seismic energy arrivals. These arrivals include, first, the energy directly from the explosive charge and then the energies arriving indirectly from reflections that take place at different density changes in the subterranean strata or formations below the location of the explosive charge. Upon receipt of the seismic energy reflections by geophone 10 and after conversion thereof to electrical signals, these signals representative of the seismic energy are translated via the electrical path 14 to a seismic amplifier 16. The path 14 includes suitable electrical conductors. After the signals have been amplified in the amplifier 16 they are translated via another electrical path 18 to a preamplifier and multiplexer unit 20. The signals which are still in analog form which are handled by the unit 20 are then translated via the electrical path 22 to an analog to digital converter 24.

The analog to digital converter 24, as the name implies, transforms the analog seismic signals to digital signals. From the converter 24 the signals in digital form are translated via the path 26 to a transfer register 28. From transfer register 28 the digital signals are translated to a write amplifier 28 via the electrical path 30. From write amplifier 28 the signals are recorded on a magnetic tape recording unit 32, the signals being translated from amplifier 28 via the electrical path 34 to the tape recording unit 32.

While FIG. 1 shows the usual set-up of the various components for actually recording the seismic energy, FIG. 2, on the other hand, shows how the system of FIG. 1 is modified for analyzing noise. As shown in FIG. 2, the input to the seismic amplifier 16 is reduced to zero input by means of the input impedance element 36 which, as indicated, is connected between the input of the seismic amplifier 16 and a common ground 38. Also coupled to the output of the transfer register 28 at the electrical path 30 is a decoder 40, the decoder 40 being coupled to the path 30 via the electrical path 42. The details of the various logic elements comprising decoder 40 are shown in FIG. 3, hereinafter described. Coupled to the output of the decoder 40 as shown in FIG. 2 is an oscilloscope 44.

As shown in FIG. 3, decoder 40 is provided with the input terminals A, B, C, D, E, F, G and S. As indicated in FIG. 3 the digital bits analyzed by the decoder are $2^0$ at terminal A, $2^1$ at terminal B, $2^2$ at terminal C, $2^3$ at terminal D, $2^4$ at terminal E, $2^5$ at terminal F, $2^6$ at terminal G, and the sign at input terminal S.

As shown in FIG. 3 there is connected to the input terminals A, B, C, D, E, F, G and S the electrical paths 50, 52, 54, 56, 58, 60, 62 and 64, respectively. Also as shown in FIG. 3 the input terminals A, B, C, D, E, F, G and S are coupled via the paths 50, 52, 54, 56, 58, 60, 62 and 64 to the inverters 66, 68, 70, 72, 74, 76, 78 and 80, respectively.

Also, input terminals B and C are coupled via the paths 52 and 54 to the input of a two input AND gate 82. Similarly, input terminal C and input terminal D are coupled to the input of another two input AND gate 84 via the paths 54 and 56, respectively.

Two additional two input AND gates 86 and 88 are provided. The AND gate 86 has its two input terminals connected via the paths 68a and 70a to the outputs of the inverter 68 and 70, respectively. Similarly, one of the two inputs of AND gate 88 is connected to the output of the inverter 72 via path 72a, while the other input of the AND gate 88 is connected to the path 70a, which, in turn, connects the output of the inverter 70 with the input of the AND gate 86. Also, as shown in FIG. 3 there are provided a group of AND gates 90, 92, 94, 96, 98, 100, 102, 104 and 106. Each of these AND gates is a two input AND gate, as shown. Input terminals A, B, and C are connected to one of the inputs of the AND gates 90, 92 and 94, respectively, via the paths 50, 52 and 54. Input terminal D is connected to one of the inputs of the AND gate 98 via the path 56. Also input terminals E, F, and G are connected via the paths 58, 60 and 62 to the AND gates 102, 104 and 106, respectively. The AND gates 96 and 100 have one of their two inputs directly connected via the paths 82a and 84a to the outputs of the AND gates 82 and 84, respectively. Each of the AND gates 90, 92, 94, 96, 98, 100, 102, 104 and 106 has an additional input all of which are coupled in common with electrical path 108.

There is also provided another series of AND gates 110, 112, 114, 116, 118, 120, 122, 124 and 126. As shown, each of the AND gates 110 through 126 is provided with two inputs. For example, one of the inputs to the AND gate 110 is connected to the output of the inverter 66 via the electrical path 66a. One of the inputs to the AND gate 112 is connected to the output of the inverter 68 via the path 68b. Similarly, one of the inputs to the AND gate 114 is coupled to the output of the inverter 70 via the path 70b. One of the inputs to the AND gate 116 is coupled to the output of AND gate 86 via the path 86a. One of the inputs to the AND gate 118 is coupled to the output of the inverter 72 via the path 72b. One of the inputs to the AND gates 120 is coupled to the output of AND gate 88 via the path 88a. Similarly, one of the inputs to the AND gate 122 is coupled to the output of the inverter 74 via path 74a. Similarly, one of the inputs to the AND gate 124 is coupled to the output of the inverter 76 via path 76a. Finally, one of the inputs to the AND gate 126 is coupled to the output of the inverter 78 via the path 78a. The AND gates 110 through 126 also have another input, all of which are coupled in common to the path 128.

As shown in FIG. 3 there is provided a plurality of OR gates 130, 132, 134, 136, 138, 140, 142, 144 and 146. Each of these OR gates is of the two input type OR gate variety.

OR gate 30 has one input thereof connected directly to the output of the AND gate 90 while the other input thereof is connected to the output of the AND gate 110. Similarly, the OR gate 132 has one of its inputs connected directly to the output of AND gate 92 and the other input thereof directly connected with the output of AND gate 112. OR gate 134 has one input thereof directly connected to the output of AND gate 94 while the other input thereof is directly connected to the output of AND gate 114. OR gate 136 has one input thereof directly connected to the output of AND gate 96 while the other input thereof is directly connected to the output of AND gate 116. Similarly, OR gate 138 has an input thereof directly connected to the output of AND gate 98 while the other input to OR gate 138 is directly coupled to the output of AND gate 118. OR gate 140 has one input thereof directly connected to the output of AND gate 100 and the other input thereto is directly coupled to the output of AND gate 120. OR gate 142 has one input thereof directly connected to the output of AND gate 102 while the other input thereto is directly connected to the output of AND gate 122. OR gate 144 has one input thereof directly connected to the output of AND gate 104 while the other input thereto is directly connected to the output of AND gate 124. Finally, one of the inputs to OR gate 146 is directly coupled to the output of the AND gate 106 while the other input thereto is directly coupled to the output of AND gate 126.

In FIG. 3 the outputs from each of the OR gates 130, 132, 134, 136, 138, 140, 142, 144 and 146 are connected to one pole of a single pole double throw switch. In FIG. 3 these switches are designated as shown by the reference characters S$m$, S$n$, S$o$, S$p$, S$q$, S$r$, S$s$, S$t$ and S$u$. The switches S$m$ through S$u$ represent the "magnitude sensitivity switches" as labeled in FIG. 3.

Finally, there is provided the OR gate 148 the inputs of which are connected via the magnitude sensitivity switches S$m$ through S$u$ to the OR gates 130 through 146, respectively. As indicated, a "sign sensitivity switch" is provided which is a ganged switch assembly comprising two ganged selector switches including the poles 150a and 150b, respectively, the switch pole 150a being connected to the electrical path 108 and the switch pole 150b being connected to the switch path 128. The switch pole 150a may, as indicated, in FIG. 3 be placed in either of three positions, the − position, the ± position, or the + position. Similarly the switch pole 150b may be placed in the − position, the ± position, or the + position.

Note also that each of the magnitude sensitivity switches S$m$ to S$u$ can be placed in either an on or off position. For example, in FIG. 3 the switches S$m$, S$n$, S$o$, S$p$ and S$q$ are all in the off position while the switches S$r$, S$s$, S$t$ and S$u$ are all in the on position.

In the decoder logic circuitry shown in FIG. 3 the digital bits analyzed by the decoder are the sign (−, ±, or +) and the bits $2^0$, $2^1$, $2^2$, $2^3$, $2^4$, $2^5$, and $2^6$. The sign sensitivity switch is employed to limit or select the sensitivity of the decoder to positive and/or negative numbers by selecting the sign bit or its logic inverse as a gating pulse for one of two series of AND gates. The magnitude the sensitivity switches, on the other hand, are used to limit the sensitivity of the decoder to a particular magnitude of numbers. As shown, each of the magnitude sensitivity switches S$m$, S$n$, S$o$, S$p$, S$q$, S$r$, S$s$, S$t$, S$u$ when in the on position is representative of the magnitudes 1, 2, 4, 6, 8, 12, 16, 32 and 64 as shown in FIG. 3. The magnitude of positive numbers is determined by using the bits of information as they appear at the input of the decoder while for analysis of negative numbers their logic inverse function is employed. For example, if the sign sensitivity switch is in the + position and all of the magnitude sensitivity switches are closed except S$m$, S$n$ and S$o$ (representing the magnitudes 1, 2 and 4) then the decoder will put out a pulse for any word, or series of bits, that is greater than or equal to +6. If, however, the sign sensitivity switch is then switched to the ± position the decoder becomes sensitive to any number greater than or equal to +6 and less than or equal to −6, again assuming that all of the magnitude sensitivity switches are closed except S$m$, S$n$ and S$o$.

The operation of the decoder shown in FIG. 3 with all its various logic elements is best understood with reference to the Booleon algebraic expressions hereafter appearing which generally and specifically define the function of the decoder.

In the following equations the symbol A represents the binary bit $2^0$, B represents the bit $2^1$, C represents the bit $2^2$, D represents the bit $2^3$, E represents the bit $2^4$, F represents the bit $2^5$, G represents the bit $2^6$ and S represents the sign bit (−, ± or +). In Boolean algebra notation, which is the notation of symbolic logic, it is best at this point to define certain of the symbols and notations used in order that the Boolean algebra equations hereinafter appearing may be clearly understood:

$A+B$ is, in Boolean algebra terminology, read as A OR B whereas $A \cdot B$ is read as A AND B.

$A = A$; and, $\overline{A}$ is read as not A.

For further information about the notation and symbolism and manipulation of Boolean algebraic expressions see, for example, the text entitled "Boolean Algebra" published by Prentice Hall Incorporated, Englewood Cliffs, N.J. and copyright 1966 by Federal Electric Corporation, Paramus, N.J., Library of Congress, catalog No. 66–14918.

The following sets of Boolean algebra equations read in conjunction with the logic circuitry shown at FIG. 3 indicate the various logical operations of the decoder circuit:

Sign Sensitivity Switch: "±" Position (1a) Magnitude Sensitivity Switches: All "On"

$$\text{Output} = \overline{S} \cdot (A+B+C+B \cdot C+D+C \cdot D+E+F+G) + S \cdot (\overline{A}+\overline{B}+\overline{C}+\overline{B} \cdot \overline{C}+\overline{D}+\overline{C} \cdot \overline{D}+\overline{E}+\overline{F}+\overline{G})$$

(2a) Magnitude Sensitivity Switches: All "On" Except S$m$ $$\text{Output} = \overline{S} \cdot (B+C+B \cdot C+D+C \cdot D+E+F+G) + S \cdot (\overline{B}+\overline{C}+\overline{B} \cdot \overline{C}+\overline{D}+\overline{C} \cdot \overline{D}+\overline{E}+\overline{F}+\overline{G})$$

(3a) Magnitude Sensitivity Switches: All "On" Except S$m$ and S$n$ $$\text{Output} = \overline{S} \cdot (C+B \cdot C+D+C \cdot D+E+F+G) + S \cdot (\overline{C}+\overline{B} \cdot \overline{C}+\overline{D}+\overline{C} \cdot \overline{D}+\overline{E}+\overline{F}+\overline{G})$$

(4a) Magnitude Sensitivity Switches: All "On" Except S$m$, S$n$ and S$o$ $$\text{Output} = \overline{S} \cdot (B \cdot C+D+C \cdot D+E+F+G) + S \cdot (\overline{B} \cdot \overline{C}+\overline{D}+\overline{C} \cdot \overline{D}+\overline{E}+\overline{F}+\overline{G})$$

(5a) Magnitude Sensitivity Switches: All "On" Except S$m$, S$n$, S$o$ and S$p$ $$\text{Output} = \overline{S} \cdot (D+C \cdot D+E+F+G) + S \cdot (\overline{D}+\overline{C} \cdot \overline{D}+\overline{E}+\overline{F}+\overline{G})$$

(6a) Magnitude Sensitivity Switches: All "On" Except S$m$, S$n$, S$o$, S$p$ and S$q$ $$\text{Output} = \overline{S} \cdot (C \cdot D+E+F+G) + S \cdot (\overline{C} \cdot \overline{D}+\overline{E}+\overline{F}+\overline{G})$$

(7a) Magnitude Sensitivity Switches: All "Off" Except S$s$, S$t$, and S$u$ $$\text{Output} = \overline{S} \cdot (E+F+G) + S \cdot (\overline{E}+\overline{F}+\overline{G})$$

(8a) Magnitude Sensitivity Switches: All "Off" Except S$t$ and S$u$ $$\text{Output} = \overline{S} \cdot (F+G) + S \cdot (\overline{F}+\overline{G})$$

(9a) Magnitude Sensitivity Switches: All "Off" Except S$u$ $$\text{Output} = \overline{S} \cdot G + S \cdot \overline{G}$$

(10a) Magnitude Sensitivity Switches: All "Off"

$$\text{Output} = 0$$

Sign Sensitivity Switch: "+" Position (1b) Magnitude Sensitivity Switches: All "On"

$$\text{Output} = \overline{S} \cdot (A+B+C+B \cdot C+D+C \cdot D+E+F+G)$$

(2b) Magnitude Sensitivity Switches: All "On" Except S$m$ $$\text{Output} = \overline{S} \cdot (B+C+B \cdot C+D+C \cdot D+E+F+G)$$

(3b) Magnitude Sensitivity Switches: All "On" Except S$m$ and S$n$ $$\text{Output} = \overline{S} \cdot (C+B \cdot C+D+C \cdot D+E+F+G)$$

(4b) Magnitude Sensitivity Switches: All "On" Except S$m$, S$n$ and S$o$ $$\text{Output} = \overline{S} \cdot (B \cdot C+D+C \cdot D+E+F+G)$$

(5b) Magnitude Sensitivity Switches: All "On" Except S$m$, S$n$, S$o$ and S$p$ $$\text{Output} = \overline{S} \cdot (D+C \cdot D+E+F+G)$$

(6b) Magnitude Sensitivity Switches: All "Off" Except S$r$, S$s$, S$t$ and S$u$ $$\text{Output} = \overline{S} \cdot (C \cdot D+E+F+G)$$

(7b) Magnitude Sensitivity Switches: All "Off" Except S$s$, S$t$ and S$u$ $$\text{Output} = \overline{S} \cdot (E+F+G)$$

(8b) Magnitude Sensitivity Switches: All "Off" Except S$t$ and S$u$ $$\text{Output} = \overline{S} \cdot (F+G)$$

(9b) Magnitude Sensitivity Switches: All "Off" Except S$u$ $$\text{Output} = \overline{S} \cdot G$$

(10b) Magnitude Sensitivity Switches: All "Off"

$$\text{Output} = 0$$

Sign Sensitivity Switch: "−" Position (1c) Magnitude Sensitivity Switches: All "On"

$$\text{Output} = S \cdot (\overline{A}+\overline{B}+\overline{C}+\overline{B} \cdot \overline{C}+\overline{D}+\overline{C} \cdot \overline{D}+\overline{E}+\overline{F}+\overline{G})$$

(2c) Magnitude Sensitivity Switches: All "On" Except S$m$ $$\text{Output} = S \cdot (\overline{B}+\overline{C}+\overline{B} \cdot \overline{C}+\overline{D}+\overline{C} \cdot \overline{D}+\overline{E}+\overline{F}+\overline{G})$$

(3c) Magnitude Sensitivity Switches: All "On" Except S$m$ and S$n$ $$\text{Output} = S \cdot (\overline{C} + \overline{B} \cdot \overline{C} + \overline{D} + \overline{C} \cdot \overline{D} + \overline{E} + \overline{F} + \overline{G})$$

(4c) Magnitude Sensitivity Switches: All "On" Except S$m$, S$n$ and S$o$ $$\text{Output} = S \cdot (\overline{B} \cdot \overline{C} + \overline{D} + \overline{C} \cdot \overline{D} + \overline{E} + \overline{F} + \overline{G})$$

(5c) Magnitude Sensitivity Switches: All "On" Except S$m$, S$n$, S$o$ and S$p$ $$\text{Output} = S \cdot (\overline{D} + \overline{C} \cdot \overline{D} + \overline{E} + \overline{F} + \overline{G})$$

(6c) Magnitude Sensitivity Switches: All "Off" Except S$r$, S$s$, S$t$ and S$u$ $$\text{Output} = S \cdot (\overline{C} \cdot \overline{D} + \overline{E} + \overline{F} + \overline{G})$$

(7c) Magnitude Sensitivity Switches: All "Off" Except S$s$, S$t$ and S$u$ $$\text{Output} = S \cdot (\overline{E} + \overline{F} + \overline{G})$$

(8c) Magnitude Sensitivity Switches: All "Off" Except S$t$ and S$u$ $$\text{Output} = S \cdot (\overline{F} + \overline{G})$$

(9c) Magnitude Sensitivity Switches: All "Off" Except S$u$ $$\text{Output} = S \cdot \overline{G}$$

(10c) Magnitude Sensitivity Switches: All "Off"

$$\text{Output} = 0$$

The truth table below is given as a sample of several conditions of the various inputs. It applies to the most general equation with the sign sensitivity switch in the "±" position, and all of the magnitude sensitivity switches "On."

| A | B | C | D | E | F | G | S | Output |
|---|---|---|---|---|---|---|---|---|
| 0 | 0 | 0 | 0 | 0 | 0 | 0 | 0 | 0 |
| 1 | 0 | 0 | 0 | 0 | 0 | 0 | 0 | 1 |
| 0 | 1 | 0 | 0 | 0 | 0 | 0 | 0 | 1 |
| 0 | 0 | 1 | 0 | 0 | 0 | 0 | 0 | 1 |
| 0 | 0 | 0 | 1 | 0 | 0 | 0 | 0 | 1 |
| 0 | 0 | 0 | 0 | 1 | 0 | 0 | 0 | 1 |
| 0 | 0 | 0 | 0 | 0 | 1 | 0 | 0 | 1 |
| 0 | 0 | 0 | 0 | 0 | 0 | 1 | 0 | 1 |
| 1 | 1 | 1 | 1 | 1 | 1 | 1 | 0 | 1 |
| 0 | 0 | 0 | 0 | 0 | 0 | 0 | 1 | 1 |
| 1 | 0 | 0 | 0 | 0 | 0 | 0 | 1 | 1 |
| 0 | 1 | 0 | 0 | 0 | 0 | 0 | 1 | 1 |
| 0 | 0 | 1 | 0 | 0 | 0 | 0 | 1 | 1 |
| 0 | 0 | 0 | 1 | 0 | 0 | 0 | 1 | 1 |
| 0 | 0 | 0 | 0 | 1 | 0 | 0 | 1 | 1 |
| 0 | 0 | 0 | 0 | 0 | 1 | 0 | 1 | 1 |
| 0 | 0 | 0 | 0 | 0 | 0 | 1 | 1 | 1 |
| 1 | 1 | 1 | 1 | 1 | 1 | 1 | 1 | 0 |

A truth table may be arrived at from each of the equations.

While a preferred embodiment and practice of the invention has been described in considerable detail in accordance with the applicable statutes this is not to be taken as in any way limiting of the invention but merely as being descriptive thereof.

What is claimed is:

1. In a seismic data processing system having an inherent noise signal in analog form mixed with a seismic signal in analog form wherein the mixed signals are converted to a plurality of digital bit signals forming a digital word representative of the mixed analog signals, the method of determining the noise present in the system comprising the steps of: eliminating the presence of the analog form seismic signal; converting the analog form noise signal to a plurality of digital bit signals forming a digital word representative of the analog form noise signal; and; detecting the presence of selected digital bit signals in the digital word representing the analog form noise signal.

2. In a seismic data processing system having an inherent noise signal in analog form mixed with a seismic signal in analog form wherein the mixed signals are converted to a plurality of digital bit signals forming a digital word representative of the polarity and magnitude of the mixed analog signal, the method of determining the noise present in said system comprising the steps of: reducing the magnitude of the analog form seismic signal to zero; converting the analog form noise signal to a plurality of digital bit signals forming a digital word representative of the polarity and magnitude of the analog form noise signal; and, detecting the presence of selected digital bit signals in the digital word representing the analog form noise signal.

3. In a seismic data processing system according to claim 2 further comprising the steps of: reintroducing the analog form seismic signal into the system; converting the analog form seismic signal to a plurality of digital bit signals forming a digital word representative of the polarity and magnitude of the analog form seismic signal; and, comparing the digital word representing the seismic signal with the selected digital bit signals in the digital word representing the noise signal.

References Cited

UNITED STATES PATENTS

| 3,134,957 | 5/1964 | Foote et al. | 340—15.5 |
| 3,376,557 | 4/1968 | Godinez | 340—15.5 |

RODNEY D. BENNETT, JR., Primary Examiner

C. E. WANDS, Assistant Examiner